(12) United States Patent
Namikawa et al.

(10) Patent No.: US 9,889,879 B2
(45) Date of Patent: Feb. 13, 2018

(54) STEERING CONTROL DEVICE

(71) Applicant: JTEKT CORPORATION, Osaka-shi, Osaka (JP)

(72) Inventors: Isao Namikawa, Okazaki (JP); Terutaka Tamaizumi, Okazaki (JP)

(73) Assignee: JTEKT CORPORATION, Osaka (JP)

( * ) Notice: Subject to any disclaimer, the term of this patent is extended or adjusted under 35 U.S.C. 154(b) by 0 days.

(21) Appl. No.: 15/434,162

(22) Filed: Feb. 16, 2017

(65) Prior Publication Data
US 2017/0247048 A1    Aug. 31, 2017

(30) Foreign Application Priority Data

Feb. 26, 2016 (JP) ................................ 2016-035522

(51) Int. Cl.
*B62D 5/04* (2006.01)
*B62D 3/12* (2006.01)
*B62D 6/00* (2006.01)

(52) U.S. Cl.
CPC ............ *B62D 5/0463* (2013.01); *B62D 3/12* (2013.01); *B62D 5/0412* (2013.01); *B62D 6/006* (2013.01); *B62D 6/008* (2013.01)

(58) Field of Classification Search
CPC ...... B62D 5/0463; B62D 3/12; B62D 5/0412; B62D 6/006; B62D 6/008
See application file for complete search history.

(56) References Cited

U.S. PATENT DOCUMENTS

| | | | | |
|---|---|---|---|---|
| 5,845,222 A * | 12/1998 | Yamamoto | ........... | B62D 5/0472 180/422 |
| 6,736,236 B2 * | 5/2004 | Kurishige | ............ | B62D 5/0466 180/443 |
| 6,854,559 B2 * | 2/2005 | Kurishige | .............. | B62D 6/008 180/443 |

(Continued)

FOREIGN PATENT DOCUMENTS

| | | |
|---|---|---|
| EP | 2 842 839 A2 | 3/2015 |
| JP | 2015-042528 A | 3/2015 |

OTHER PUBLICATIONS

Nov. 29, 2017 Search Report issued in European Patent Application No. 17157236.5.

*Primary Examiner* — Russell Frejd
(74) *Attorney, Agent, or Firm* — Oliff PLC

(57) ABSTRACT

A steering control device capable of transmitting road surface state to a driver is provided. An ideal vehicle model computes first spring reaction force torque based on a target pinion angle and second spring reaction force torque based on at least lateral acceleration as components of a spring component of a steering assist force. The ideal vehicle model combines the first and second spring reaction force torques with specified proportions of use to compute the spring component. The ideal vehicle model decides the proportions of use of the first and second spring reaction force torques on the basis of a distribution gain set in accordance with the difference value between the first and second spring reaction force torques. The ideal vehicle model increases the proportion of use of the second spring reaction force torque as the difference value between the first and second spring reaction force torques is increased.

6 Claims, 8 Drawing Sheets

(56) References Cited

U.S. PATENT DOCUMENTS

| | | | |
|---|---|---|---|
| 8,160,777 B2* | 4/2012 | Tamaizumi | B62D 5/0487 |
| | | | 180/422 |
| 9,505,428 B2* | 11/2016 | Chai | B62D 6/008 |
| 2015/0057890 A1 | 2/2015 | Tamaizumi et al. | |
| 2017/0021858 A1* | 1/2017 | Kodera | B62D 6/008 |

* cited by examiner

STEERING CONTROL DEVICE

INCORPORATION BY REFERENCE

The disclosure of Japanese Patent Application No. 2016-035522 filed on Feb. 26, 2016 including the specification, drawings and abstract, is incorporated herein by reference in its entirety.

BACKGROUND OF THE INVENTION

1. Field of the Invention

The present invention relates to a steering control device.

2. Description of the Related Art

There has hitherto been known an electric power steering device (hereinafter referred to as an "EPS") that assists a driver in steering by applying power of a motor to a steering mechanism of a vehicle. Examples of the steering mechanism include a steering mechanism of a so-called rack-and-pinion type. Rotational motion of a steering shaft is converted into linear motion of a rack shaft through meshing between a pinion shaft and the rack shaft to change the steered angle of steered wheels. A control device for the EPS controls the motor on the basis of the results of detection performed by various sensors provided in the vehicle.

For example, a control device for an EPS described in Japanese Patent Application Publication No. 2015-42528 (JP 2015-42528 A) computes a basic assist component, which is a basic component of a steering assist force to be applied to a steering mechanism, on the basis of steering torque and the vehicle speed. In addition, the control device calculates a target pinion angle on the basis of basic drive torque, which is the total sum of the steering torque and the basic assist component, and computes a correction component for the basic assist component through feedback control in which the actual pinion angle is caused to coincide with the target pinion angle.

In order to increase a steering reaction force in accordance with an increase in lateral acceleration that acts on the vehicle, the control device computes a spring component of the basic drive torque on the basis of the target pinion angle, decreases the magnitude of the basic drive torque in accordance with the spring component, and computes a correction component for the basic assist component. The control device computes a first component of the spring component based on the target pinion angle and a second component of the spring component based on the lateral acceleration, and sets the proportions of use of the first component and the second component in accordance with the magnitude of the lateral acceleration. As the lateral acceleration becomes larger, the control device decreases the proportion of use of the first component, and increases the proportion of use of the second component.

The target pinion angle, and hence the correction component for the basic assist component, are decreased by an amount corresponding to a decrease in basic drive torque matching the spring component. As the correction component is decreased, the steering assist force to be applied to the steering mechanism is also decreased. The steering reaction force is increased in accordance with a decrease in steering assist force, and therefore a suitable steering reaction force can be obtained in accordance with the magnitude of the lateral acceleration. Thus, it is possible to harmonize the lateral acceleration to be received by the body of the driver and the steering reaction force (response) to be felt by hands of the driver through steering.

The first component of the spring component which is based on the target pinion angle contributes to a so-called sense of rigidity (sense of stability). The second component of the spring component, which is based on the lateral acceleration, contributes to a sense of integrity with the vehicle. Therefore, the sense of rigidity and the sense of integrity can be obtained suitably by adjusting the proportions of use of the first component and the second component in accordance with the lateral acceleration. For example, as the lateral acceleration is larger, it is conceivable that the sense of integrity with the vehicle is insufficient, and thus the proportion of use of the second component is increased. Consequently, it is possible to suitably obtain the sense of integrity with the vehicle in accordance with the magnitude of the lateral acceleration.

The control device according to JP 2015-42528 A, which sets the proportions of use of the first component of the spring component and the second component in accordance with the magnitude of the lateral acceleration, involves the following apprehensions. For example, when the vehicle is traveling on a low-friction road, the vehicle is less likely to be subjected to lateral acceleration. As the lateral acceleration is smaller, the proportion of use of the second component is decreased. Therefore, when the vehicle is traveling on a low-friction road, the spring component of the basic drive torque tends to be mainly composed of the first component. The first component of the spring component contributes to the so-called sense of rigidity, and therefore the driver feels a stronger sense of rigidity as a response. The driver may feel a sense of discomfort about obtaining a stable response on a low-friction road on which he/she is originally less likely to feel a stable response as a steering feel.

SUMMARY OF THE INVENTION

It is an object of the present invention to provide a steering control device capable of transmitting a road surface state to a driver as a steering reaction force more appropriately.

An aspect of the present invention provides a steering control device that controls a motor that serves as a generation source for a drive force to be applied to a steering mechanism of a vehicle on the basis of an assist command value computed in accordance with a steering operation, including:

a first computation circuit that computes a basic component of the assist command value in accordance with at least steering torque; and a first computation circuit that computes a basic component of the assist command value in accordance with at least steering torque; and a second computation circuit that computes a compensation component for the basic component through feedback control in which an actual rotational angle of a rotary body that rotates through the steering operation is caused to coincide with a target rotational angle calculated in accordance with the basic component, wherein the second computation circuit computes, on the basis of at least the target rotational angle, a first reaction force component for the basic component that is used to compute the target rotational angle, and the second computation circuit computes, on the basis of a state amount that reflects vehicle behavior or a road surface state, a second reaction force component for the basic component that is used to compute the target rotational angle, and the second computation circuit, in a case where a difference value between the first reaction force component and the second reaction force component is increased, increases a proportion of use of the second reaction force component compared to that before the difference value is increased.

A situation in which the vehicle is traveling on a low-friction road is assumed as an example of a situation in which the difference value between the first reaction force component and the second reaction force component tends to be increased. Here, the first reaction force component which is based on the target rotational angle is a component that contributes to the sense of rigidity of steering. Meanwhile, the second reaction force component which is based on a state amount that reflects vehicle behavior or a road surface state is a component that contributes to the sense of integrity with the vehicle. With the configuration described above, in the case where the difference value between the first reaction force component and the second reaction force component is increased, the proportion of use of the second reaction force component which contributes to the sense of integrity with the vehicle is increased compared to that before the difference value is increased, and the proportion of use of the first reaction force component which contributes to the sense of rigidity of steering is decreased in accordance with the increase. Therefore, the driver can grasp a fact that the vehicle is traveling on a low-friction road easily by feeling that the sense of rigidity has been decreased as a response. When the vehicle is traveling on a dry road with the tires gripping, lateral acceleration that matches the target rotational angle acts on the vehicle, and therefore the difference value between the first reaction force component and the second reaction force component is basically not increased or decreased significantly. The proportions of use of the first reaction force component and the second reaction force component are decided in accordance with the travel state of the vehicle at each time. Therefore, it is possible to obtain the sense of rigidity of steering and the sense of integrity with the vehicle which match the travel state of the vehicle at each time.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

A first embodiment in which a steering control device according to the present invention is embodied in an electric power steering device for a vehicle will be described below.

Figure 1:
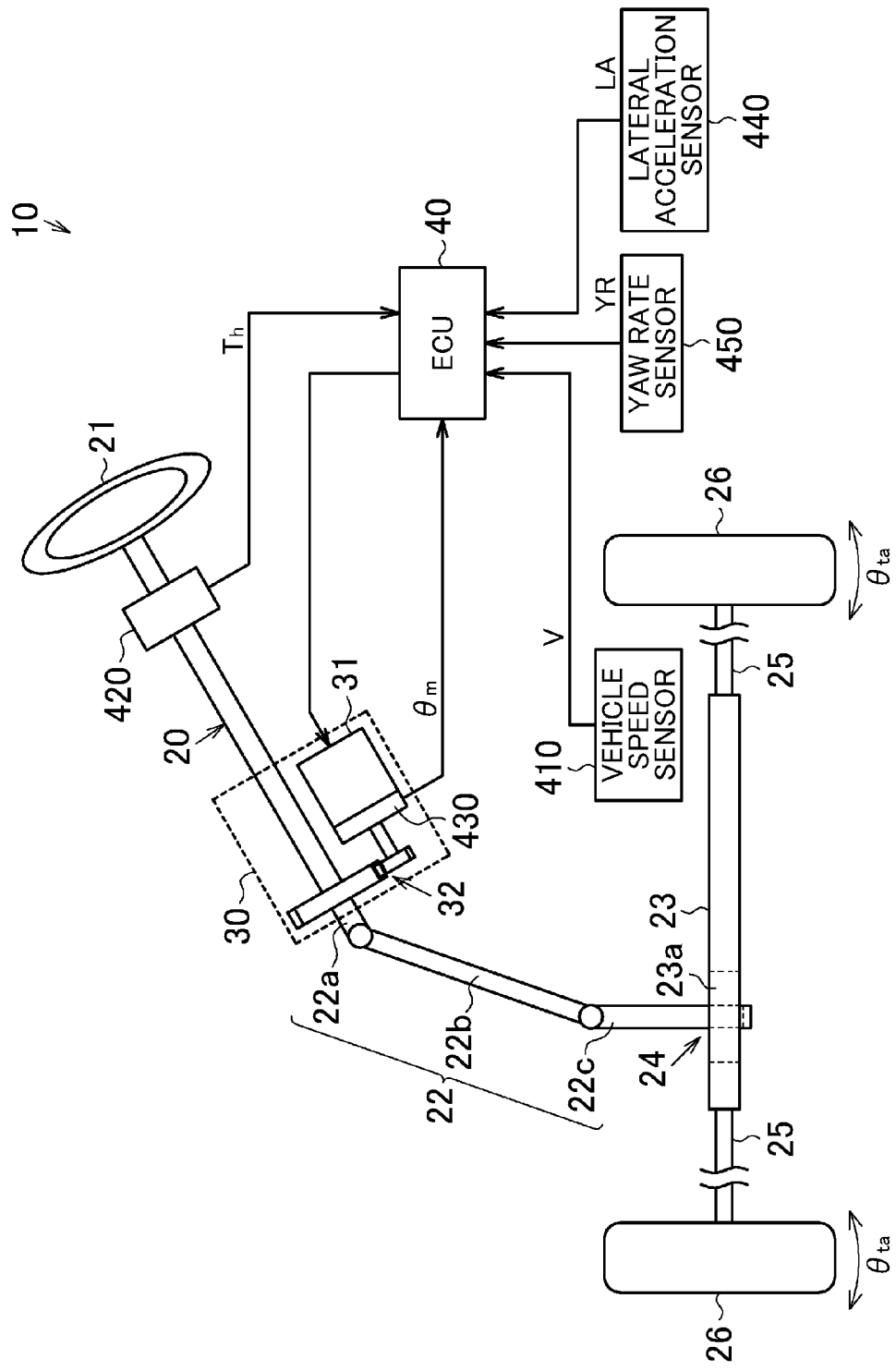
FIG. 1 is a block diagram illustrating the configuration of an electric power steering device on which an electronic control device is mounted according to a first embodiment.

As illustrated in FIG. 1, an electric power steering device (EPS) 10 includes a steering mechanism 20 that steers steered wheels on the basis of a steering operation performed by a driver, a steering assist mechanism 30 that assists the driver in performing a steering operation, and an electronic control unit (ECU) 40 that controls operation of the steering assist mechanism 30.

The steering mechanism 20 includes a steering wheel 21 operated by the driver, and a steering shaft 22 that rotates together with the steering wheel 21. The steering shaft 22 has a column shaft 22a coupled to the steering wheel 21, an intermediate shaft 22b coupled to the lower end portion of the column shaft 22a, and a pinion shaft 22c coupled to the lower end portion of the intermediate shaft 22b. The lower end portion of the pinion shaft 22c is meshed with a rack shaft 23 (to be exact, a portion 23a on which rack teeth are formed) that extends in a direction that crosses the pinion shaft 22c. Thus, rotational motion of the steering shaft 22 is converted into reciprocal linear motion of the rack shaft 23 by a rack-and-pinion mechanism 24 composed of the pinion shaft 22c and the rack shaft 23. The reciprocal linear motion is transferred to right and left steered wheels 26 and 26 via tie rods 25 coupled to opposite ends of the rack shaft 23 to change a steered angle $\theta_{ta}$ of the steered wheels 26 and 26. The advancing direction of the vehicle is changed by changing the steered angle $\theta_{ta}$ of the steered wheels 26 and 26.

The steering assist mechanism 30 includes a motor 31 that serves as a generation source for a steering assist force. A three-phase AC motor such as a brushless motor is adopted as the motor 31. The motor 31 is coupled to the column shaft 22a via a speed reduction mechanism 32. The speed reduction mechanism 32 reduces the speed of rotation of the motor 31, and transfers a rotational force at the reduced speed to the column shaft 22a. That is, motor torque is applied to the steering shaft 22 as a steering assist force (assist force) to assist the driver in performing a steering operation.

The ECU 40 acquires the results of detection performed by various sensors provided in the vehicle as information that indicates a request from the driver or the travel state, and controls the motor 31 in accordance with the acquired various information. Examples of the various sensors include a vehicle speed sensor 410, a torque sensor 420, a rotational angle sensor 430, a lateral acceleration sensor 440, and a yaw rate sensor 450. The vehicle speed sensor 410 detects a vehicle speed (travel speed of the vehicle) V. The torque sensor 420 is provided to the column shaft 22a to detect steering torque $T_h$ applied to the steering shaft 22 via the steering wheel 21. The rotational angle sensor 430 is provided to the motor 31 to detect a rotational angle $\theta_m$ of the motor 31. The lateral acceleration sensor 440 detects a lateral acceleration LA that acts on the vehicle. The lateral acceleration LA refers to an acceleration that acts in the right-left direction which is orthogonal to the advancing direction of the vehicle when the vehicle is seen from above. The yaw rate sensor 450 detects a yaw rate YR. The yaw rate YR refers to the rotational angular velocity about a vertical axis that passes through the center of gravity of the vehicle (the velocity of variation in rotational angle in a turning direction of the vehicle). The ECU 40 controls the motor 31 on the basis of the vehicle speed V, the steering torque $T_h$, the rotational angle $\theta_m$, the lateral acceleration LA, and the yaw rate YR which are acquired through such sensors.

Figure 2:
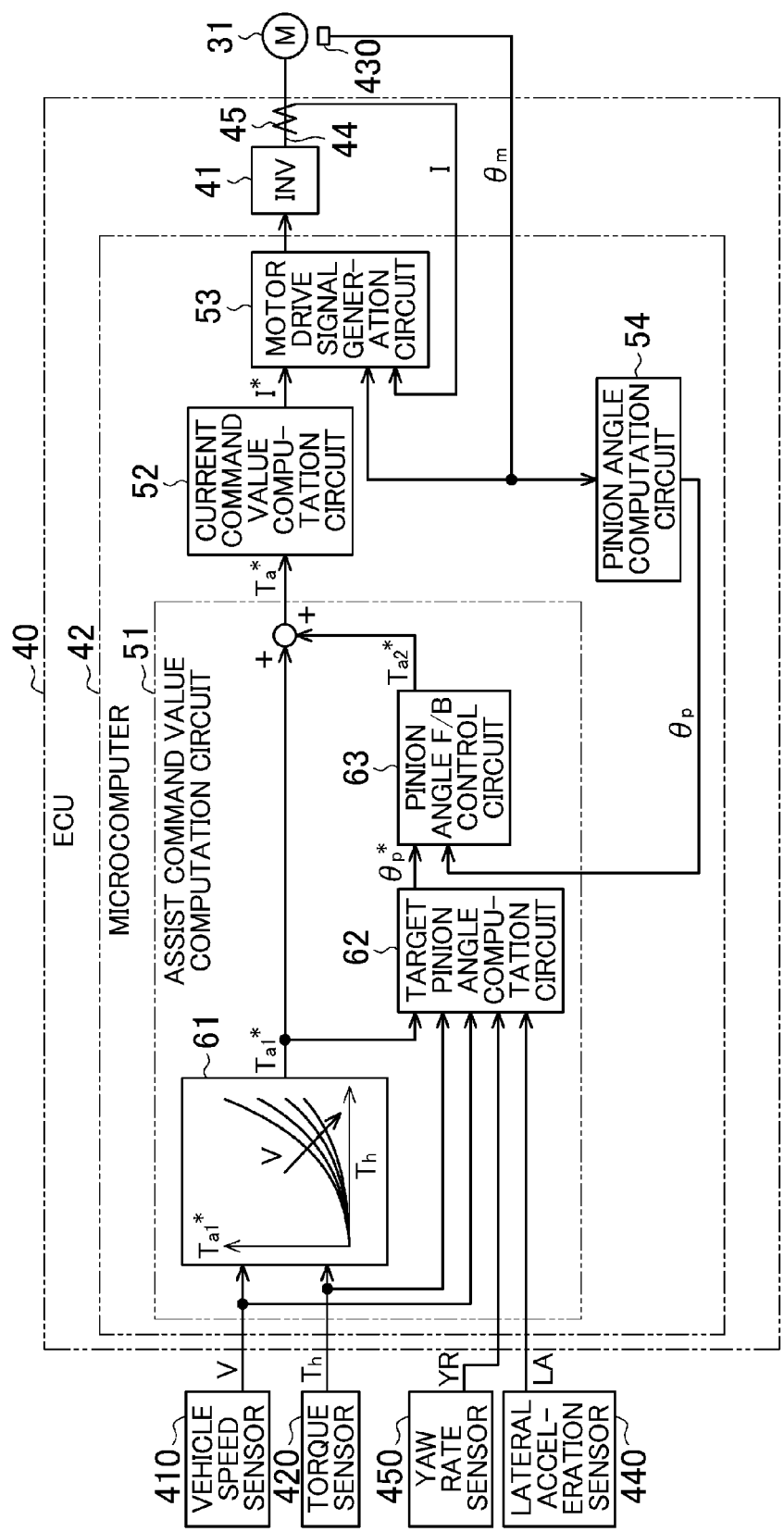
FIG. 2 is a control block diagram of the electronic control device according to the first embodiment.

Next, the hardware configuration of the ECU will be described. As illustrated in FIG. 2, the ECU 40 includes an inverter circuit 41 and a microcomputer 42.

The inverter circuit 41 converts a DC current supplied from a DC power source such as a battery into a three-phase AC current on the basis of a motor drive signal to be discussed later generated by the microcomputer 42. The resulting three-phase AC current is supplied to the motor 31 via a power supply path 44 for each phase. A current sensor 45 is provided in the power supply path 44 for each phase. The current sensor 45 detects an actual current value I of a current that flows through the power supply path 44 for each phase. In FIG. 2, for convenience of description, the power supply paths 44 for the respective phases and the current sensors 45 for the respective phases are illustrated collectively.

The microcomputer 42 retrieves the results of detection performed by the vehicle speed sensor 410, the torque sensor 420, the rotational angle sensor 430, the lateral acceleration sensor 440, the yaw rate sensor 450, and the current sensor 45 at prescribed sampling periods. The microcomputer 42 generates a motor drive signal (PWM drive signal) on the basis of the retrieved detection results, that is, the vehicle speed V, the steering torque $T_h$, the rotational angle $\theta_m$, the lateral acceleration LA, the yaw rate YR, and the current value I.

To be exact, the microcomputer 42 performs vector control for a motor current through PWM drive of the inverter circuit 41. The vector control includes dividing a motor current into a d-axis component (field current component) which is parallel to the magnetic field and a q-axis component (torque current component) which is orthogonal to the d-axis component and independently controlling the divided currents toward respective targets. Through the vector control, the motor 31 can be handled similarly to a DC motor.

Next, the functional configuration of the microcomputer will be described. The microcomputer 42 has various computation processing circuits achieved by executing a control program stored in a storage device (not illustrated). As illustrated in FIG. 2, the microcomputer 42 includes an assist command value computation circuit 51, a current command value computation circuit 52, a motor drive signal generation circuit 53, and a pinion angle computation circuit 54 as the computation processing circuits.

The assist command value computation circuit 51 retrieves the vehicle speed V, the steering torque $T_h$, and a pinion angle $\theta_p$ to be discussed later calculated by the pinion angle computation circuit 54, and computes an assist command value $T_a^*$ on the basis of the retrieved various information. The assist command value $T_a^*$ is a command value that indicates a rotational force (assist torque) to be generated by the motor 31.

The current command value computation circuit 52 computes a current command value I* on the basis of the assist command value $T_a^*$ which is calculated by the assist command value computation circuit 51. The current command value I* is a command value that indicates a current to be supplied to the motor 31. To be exact, the current command value I* includes a q-axis current command value and a d-axis current command value in a d/q coordinate system. The d/q coordinate system is used to define rotational coordinates based on the rotational angle $\theta_m$ of the motor 31.

The motor drive signal generation circuit 53 retrieves the current command value I*, the actual current value I, and the rotational angle $\theta_m$ of the motor 31, and performs feedback control for a current on the basis of the retrieved information such that the actual current value I follows the current command value I*. The motor drive signal generation circuit 53 calculates a deviation between the current command value I* and the actual current value I, and generates a motor drive signal so as to eliminate the deviation.

To be exact, the motor drive signal generation circuit 53 converts the current values for the three phases of the motor 31 into vector components for two phases, that is, a d-axis current value and a q-axis current value in the d/q coordinate system, using the rotational angle $\theta_m$. Then, the motor drive signal generation circuit 53 calculates a deviation between the d-axis current value and the d-axis current command value and a deviation between the q-axis current value and the q-axis current command value, and generates a PWM duty that eliminates such deviations. The motor drive signal which is generated by the motor drive signal generation circuit 53 includes the PWM duty. When a current that matches the motor drive signal is supplied to the motor 31 through the inverter circuit 41, the motor 31 generates a rotational force that matches the assist command value $T_a^*$.

The pinion angle computation circuit 54 retrieves the rotational angle $\theta_m$ of the motor 31, and computes the pinion angle $\theta_p$, which is the rotational angle of the pinion shaft 22c, on the basis of the retrieved rotational angle $\theta_m$. As discussed earlier, the motor 31 is coupled to the column shaft 22a via the speed reduction mechanism 32.

Therefore, there is a correlation between the rotational angle $\theta_m$ of the motor 31 and the pinion angle $\theta_p$. The pinion angle $\theta_p$ can be calculated from the rotational angle $\theta_m$ of the motor 31 utilizing the correlation. Further, as also discussed earlier, the pinion shaft 22c is meshed with the rack shaft 23. Therefore, there is also a correlation between the pinion angle $\theta_p$ and the amount of movement of the rack shaft 23. That is, the pinion angle $\theta_p$ is a value that reflects the steered angle $\theta_{ta}$ of the steered wheels 26. The pinion angle $\theta_p$ is subjected to feedback control performed on the basis of a target pinion angle $\theta_p^*$ to be discussed later.

Next, the assist command value computation circuit 51 will be described in detail. As illustrated in FIG. 2, the assist command value computation circuit 51 has a basic assist component computation circuit 61, a target pinion angle computation circuit 62, and a pinion angle feedback control circuit (pinion angle F/B control circuit) 63.

The basic assist component computation circuit 61 computes a basic assist component $T_{a1}^*$ on the basis of the vehicle speed V and the steering torque $T_h$. The basic assist component $T_{a1}^*$ is a basic component of the assist command value $T_a^*$. The basic assist component computation circuit 61 computes the basic assist component $T_{a1}^*$ using a three-dimensional map that prescribes the relationship between the steering torque $T_h$ and the basic assist component $T_{a1}^*$ in accordance with the vehicle speed V. The basic assist component computation circuit 61 sets the absolute value of the basic assist component $T_{a1}^*$ to a larger value as the absolute value of the steering torque $T_h$ becomes larger and as the vehicle speed V becomes lower.

The target pinion angle computation circuit 62 retrieves the basic assist component $T_{a1}^*$, which is generated by the basic assist component computation circuit 61, and the steering torque $T_h$. The target pinion angle computation circuit 62 has an ideal model that determines an ideal pinion angle on the basis of basic drive torque when the total sum of the basic assist component $T_{a1}^*$ and the steering torque $T_h$ is defined as the basic drive torque (input torque). The ideal model is obtained by preliminarily modeling a pinion angle corresponding to an ideal steered angle that matches the basic drive torque through an experiment or the like. The target pinion angle computation circuit 62 adds the basic assist component $T_{a1}^*$ and the steering torque $T_h$ to calculate the basic drive torque, and computes the target pinion angle $\theta_p^*$ on the basis of the ideal model from the calculated basic drive torque. The target pinion angle computation circuit 62 retrieves the vehicle speed V, the lateral acceleration LA, and the yaw rate YR, and computes the target pinion angle $\theta_p^*$ in consideration of the vehicle speed V, the lateral acceleration LA, and the yaw rate YR.

The pinion angle feedback control circuit 63 retrieves the target pinion angle $\theta_p^*$ which is calculated by the target pinion angle computation circuit 62 and the actual pinion angle $\theta_p$ which is calculated by the pinion angle computation circuit 54. The pinion angle feedback control circuit 63 performs proportional-integral-differential (PID) control as feedback control for the pinion angle such that the actual pinion angle $\theta_p$ follows the target pinion angle $\theta_p^*$. That is, the pinion angle feedback control circuit 63 calculates a deviation between the target pinion angle $\theta_p^*$ and the actual pinion angle $\theta_p$, and calculates a correction component $T_{a2}^*$ (compensation component) for the basic assist component $T_{a1}^*$ so as to eliminate the deviation.

The assist command value computation circuit 51 adds the correction component $T_{a2}^*$ to the basic assist component $T_{a1}^*$ to compute the assist command value $T_a^*$.

Next, the target pinion angle computation circuit 62 will be described in detail. As discussed earlier, the target pinion angle computation circuit 62 computes the target pinion angle $\theta_p^*$ on the basis of the ideal model from the basic drive torque which is the total sum of the basic assist component $T_{a1}^*$ and the steering torque $T_h$. The ideal model is a model that utilizes a fact that torque applied to the steering shaft 22, that is, the basic drive torque $T_p^*$ discussed earlier, is represented by the following formula (A).

$$T_p^* = J\theta_p^{*\prime\prime} + C\theta_p^{*\prime} + K\theta_p^* \quad (A)$$

In the formula, "J" is the moment of inertia of the steering wheel 21 and the steering shaft 22. "C" is the viscosity coefficient (friction coefficient) corresponding to the friction of the rack shaft 23 with respect to a housing or the like. "K" is the spring coefficient with each of the steering wheel 21 and the steering shaft 22 considered as a spring.

As seen from the formula (A), the basic drive torque $T_p^*$ is obtained by adding a value obtained by multiplying a second-order time differential value $\theta p^{*\prime\prime}$ of the target pinion angle $\theta_p^*$ by the moment of inertia J, a value obtained by multiplying a first-order time differential value $\theta_p^{*\prime}$ of the target pinion angle $\theta_p^*$ by the viscosity coefficient C, and a value obtained by multiplying the target pinion angle $\theta_p^*$ by the spring coefficient K.

Figure 3:
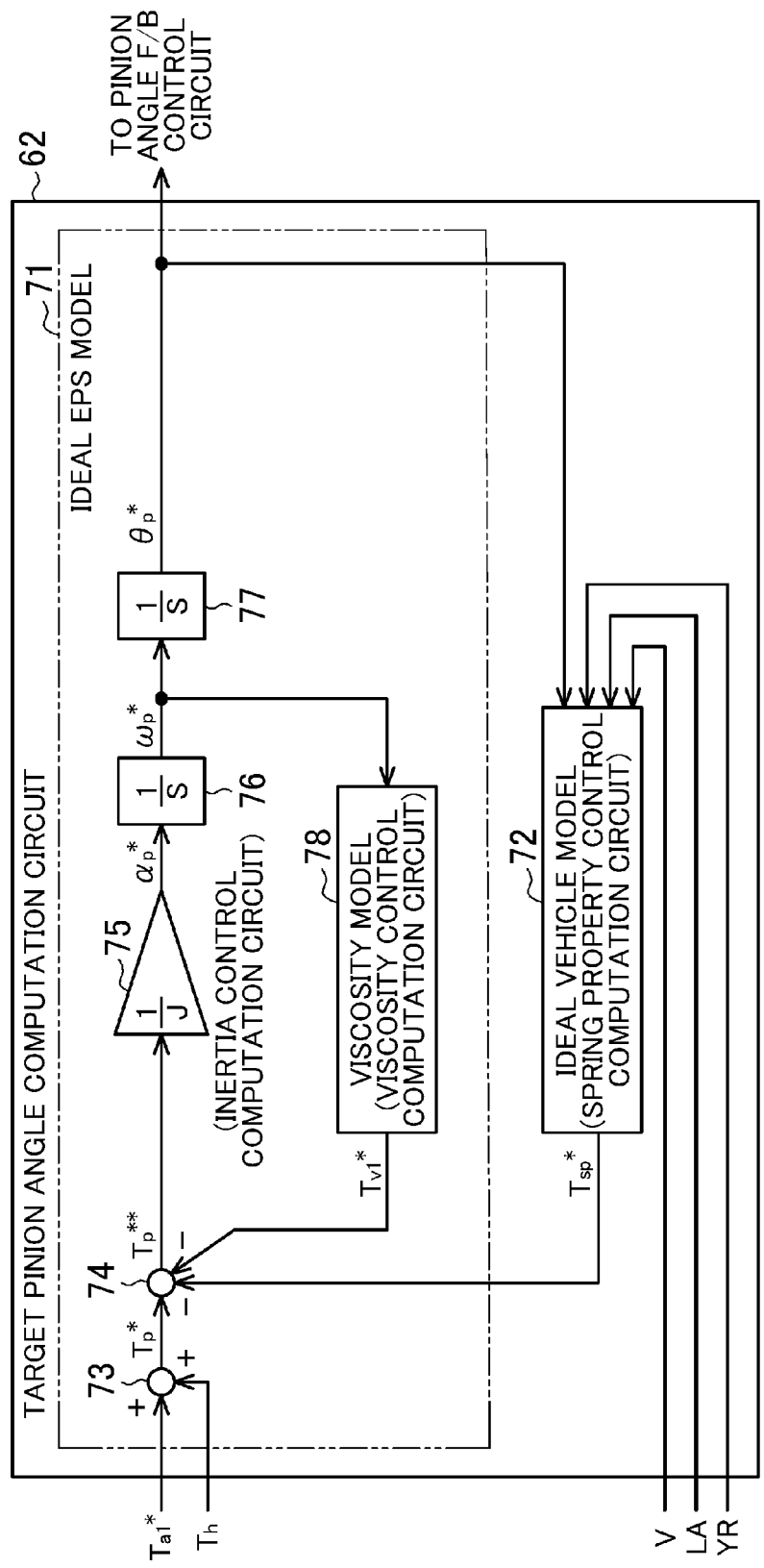
FIG. 3 is a control block diagram of a target pinion angle computation circuit according to the first embodiment.

The target pinion angle computation circuit 62 computes the target pinion angle $\theta_p^*$ in accordance with an ideal model based on the formula (A). As illustrated in FIG. 3, the ideal model based on the formula (A) is divided into an ideal EPS model 71 and an ideal vehicle model 72.

The ideal EPS model 71 is tuned in accordance with the properties of constituent elements of the electric power steering device 10 such as the steering shaft 22 and the motor 31. The ideal EPS model 71 has an adder 73, a subtractor 74, an inertia model 75, a first integrator 76, a second integrator 77, and a viscosity model 78.

The adder 73 adds the basic assist component $T_{a1}^*$ and the steering torque $T_h$ to compute the basic drive torque $T_p^*$. The subtractor 74 subtracts a viscosity component $T_{vi}^*$ and a spring component $T_{sp}^*$ to be discussed later from the basic drive torque $T_p^*$ which is calculated by the adder 73. Here, the value of the basic drive torque $T_p^*$ from which the viscosity component $T_{vi}^*$ and the spring component $T_{sp}^*$ have been subtracted is defined as a subtraction value $T_p^{**}$.

The inertia model 75 functions as an inertia control computation circuit corresponding to the inertia term of the formula (A). The inertia model 75 multiplies the subtraction value $T_p^{}$, which is calculated by the subtractor 74**, by the reciprocal of the moment of inertia J to compute a pinion angle acceleration $\alpha_p^*$.

The first integrator 76 integrates the pinion angle acceleration $\alpha_p^*$, which is calculated by the inertia model 75, to compute a pinion angle velocity $\omega_p^*$. The second integrator 77 further integrates the pinion angle velocity $\omega_p^*$, which is calculated by the first integrator 76, to compute the target pinion angle $\theta_p^*$. The target pinion angle $\theta_p^*$ is an ideal rotational angle of the pinion shaft 22c based on the ideal EPS model 71.

The viscosity model 78 functions as a viscosity control computation circuit corresponding to the viscous term of the formula (A). The viscosity model 78 multiplies the pinion angle velocity $\omega_p^*$, which is calculated by the first integrator 76, by the viscosity coefficient C to compute the viscosity component $T_{vi}^*$ of the basic drive torque $T_p^*$.

The ideal vehicle model 72 is tuned in accordance with the properties of the vehicle on which the electric power steering device 10 is mounted. The properties of the vehicle which affect the steering properties are decided in accordance with the specifications of suspensions and wheel alignment, the gripping force (friction force) of the steered wheels 26 and 26, and so forth, for example. The ideal vehicle model 72 functions as a spring property control computation circuit corresponding to the spring term of the formula (A). The ideal vehicle model 72 multiplies the target pinion angle $\theta_p^*$, which is calculated by the second integrator 77, by the spring coefficient K to compute the spring component $T_{sp}^*$ of the basic drive torque $T_p^*$. The ideal vehicle model 72 computes the spring component $T_{sp}^*$ in consideration of the vehicle speed V, the lateral acceleration LA, and the yaw rate YR.

With the thus configured target pinion angle computation circuit 62, it is possible to directly tune the relationship between the basic drive torque $T_p^*$ and the target pinion angle $\theta_p^*$, and hence achieve desired steering properties, by adjusting the moment of inertia J and the viscosity coefficient C of the ideal EPS model 71 and the spring coefficient K of the ideal vehicle model 72.

In this example, the target pinion angle $\theta_p^*$ is set on the basis of the ideal EPS model 71 and the ideal vehicle model 72 from the basic drive torque $T_p^*$, and feedback control is performed such that the actual pinion angle $\theta_p$ coincides with the target pinion angle $\theta_p^*$. As discussed earlier, there is a correlation between the pinion angle $\theta_p$ and the steered angle $\theta_{ta}$ of the steered wheels 26 and 26. Therefore, steering operation for the steered wheels 26 and 26 matching the basic drive torque $T_p^*$ is also determined by the ideal EPS model 71 and the ideal vehicle model 72. That is, the steering feel of the vehicle is decided by the ideal EPS model 71 and the ideal vehicle model 72. Thus, a desired steering feel can be achieved by adjusting the ideal EPS model 71 and the ideal vehicle model 72.

The actual steered angle $\theta_{ta}$ is maintained at a steered angle $\theta_{ta}$ that matches the target pinion angle $\theta_p^*$. Therefore, it is possible to obtain the effect in suppressing reverse input vibration generated because of disturbance such as a road surface state or braking. That is, the correction component $T_{a2}^*$ is adjusted such that the pinion angle $\theta_p$ is brought to the target pinion angle $\theta_p^*$ even in the case where vibration is transferred to the steering mechanism 20 via the steered wheels 26 and 26. Therefore, the actual steered angle $\theta_{ta}$ is maintained at a steered angle $\theta_{ta}$ that matches the target pinion angle $\theta_p^*$ which is regulated by the ideal models. As a result, a steering assist is performed in the direction of canceling reverse input vibration to suppress transmission of the reverse input vibration to the steering wheel 21.

It is true that a sense of rigidity (a so-called sense of stability) of steering can be obtained through feedback control for the pinion angle $\theta_p$ as discussed earlier. However, a steering reaction force (a response felt through steering), which is a force (torque) that acts in a direction opposite to the direction of steering by the driver, only matches the target pinion angle $\theta_p^*$, and therefore the following apprehensions are involved. For example, in the case where lateral acceleration that acts on the vehicle is increased along with steering, the driver feels the lateral acceleration LA which matches the steering amount with his/her body. However, the steering reaction force is not varied, and therefore the sense of integrity with the vehicle may be insufficient, depending on the drive situation. In addition, the steering reaction force is also not varied in accordance with the road surface state. Therefore, it is not easy for the driver to grasp the road surface state through the steering reaction force, and the driver may feel a sense of discomfort with deviation between a response that the driver himself/herself images and the actual response. Thus, in this example, the target pinion angle computation circuit 62, specifically the ideal vehicle model 72, is configured on the basis of the viewpoint of resolving such apprehensions.

Figure 4:
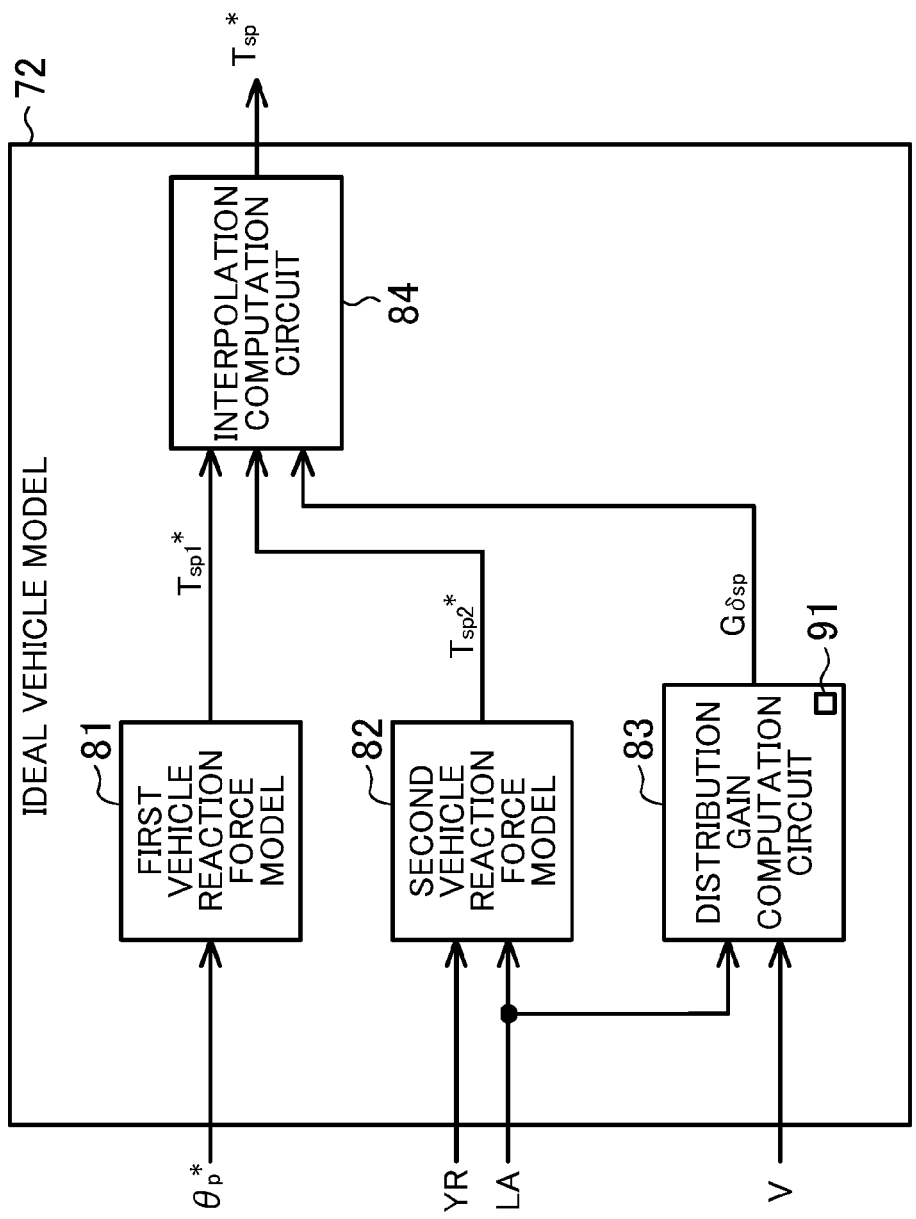
FIG. 4 is a control block diagram of an ideal vehicle model according to the first embodiment.

Next, the ideal vehicle model 72 will be described in detail. As illustrated in FIG. 4, the ideal vehicle model 72 has a first vehicle reaction force model 81, a second vehicle reaction force model 82, a distribution gain computation circuit 83, and an interpolation computation circuit 84.

The first vehicle reaction force model 81 computes a first spring reaction force torque $T_{sp1}^*$. The first spring reaction force torque $T_{sp1}^*$ is a steering reaction force component (a reaction force component to be applied to steering) that matches the target pinion angle $\theta_p^*$, and contributes to the sense of rigidity (sense of stability) of steering. The first vehicle reaction force model 81 retrieves the target pinion angle $\theta_p^*$ which is calculated by the second integrator 77, and multiplies the retrieved target pinion angle $\theta_p^*$ by the spring coefficient K to compute the first spring reaction force torque $T_{sp1}^*$ which matches the target pinion angle $\theta_p^*$. The first spring reaction force torque $T_{sp1}^*$ is a first reaction force component of the spring component $T_{sp}^*$ discussed earlier.

The second vehicle reaction force model 82 computes a second spring reaction force torque $T_{sp2}^*$. The second spring reaction force torque $T_{sp2}^*$ is a steering reaction force component that matches the lateral acceleration LA which acts on the vehicle, and has properties that are similar to those of a reaction force that acts on the actual vehicle. The second spring reaction force torque $T_{sp2}^*$ contributes to the sense of integrity with the vehicle.

In theory, the second spring reaction force torque $T_{sp2}^*$ is calculated by the following formula (B).

$$T_{sp2}^* = (\zeta/l_n) \cdot (I/l) \cdot (l_r \cdot m \cdot LA + I \cdot \gamma') \qquad (B)$$

In the formula, "$\zeta$" is the trail amount, "$l_n$" is the knuckle arm length, "I" is the yaw moment of inertia which acts on the vehicle, "l" is the wheel base, "$l_r$" is the distance between the front wheel axle and the center of gravity of the vehicle with the vehicle seen from a lateral side, "m" is the weight of the vehicle, "LA" is the lateral acceleration which acts on the vehicle, and "$\gamma'$" is the yaw angle acceleration which is obtained by differentiating the yaw rate YR with respect to the time.

In this example, the second spring reaction force torque $T_{sp2}^*$ is calculated using the following formula (C), which is obtained by omitting $I \cdot \gamma'$ from the formula (B), although the second spring reaction force torque $T_{sp2}^*$ can be calculated on the basis of the formula (B). This is because the value of $I \cdot \gamma'$ in the formula (B) may be affected by noise.

$$T_{sp2}^* = (\zeta/l_n) \cdot (I/l) \cdot (l_r \cdot m \cdot LA) \qquad (C)$$

Thus, the second vehicle reaction force model 82 can calculate the second spring reaction force torque $T_{sp2}^*$ by applying the lateral acceleration LA, which is acquired through the lateral acceleration sensor 440, to the formula (C). The second spring reaction force torque $T_{sp2}^*$ is a second reaction force component of the spring component $T_{sp}^*$ discussed earlier. The second vehicle reaction force model 82 may compute the second spring reaction force torque $T_{sp2}^*$ using the formula (B) given earlier, depending on the product specifications.

As illustrated in FIG. 4, the distribution gain computation circuit 83 computes a distribution gain $G_{\delta sp}$ using its own gain map 91. The distribution gain computation circuit 83 also computes a difference value $T_{\delta sp}^*$ ($=|T_{sp1}^* - T_{sp2}^*|$) between the first spring reaction force torque $T_{sp1}^*$ which is computed by the first vehicle reaction force model 81 and the second spring reaction force torque $T_{sp2}^*$ which is computed by the second vehicle reaction force model 82. The gain map 91 is a three-dimensional map that prescribes the relationship between the difference value $T_{\delta sp}^*$ and the distribution gain $G_{\delta sp}$ for each vehicle speed V (or vehicle speed range). The distribution gain $G_{\delta sp}$ is used to decide the proportions of use of the first spring reaction force torque $T_{sp1}^*$ and the second spring reaction force torque $T_{sp2}^*$.

Figure 5:
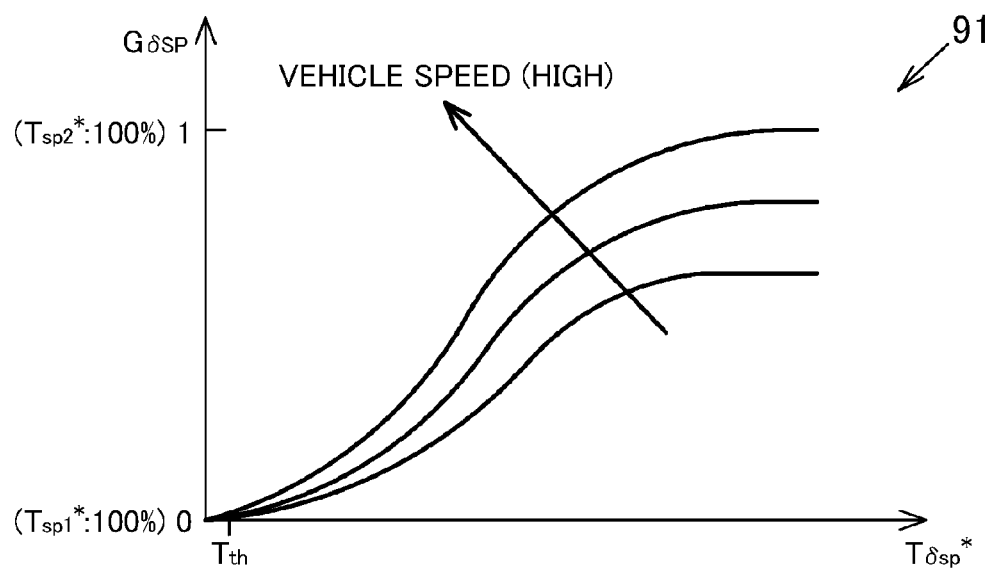
FIG. 5 is a graph illustrating a gain map according to the first embodiment.

As indicated in the graph of FIG. 5, in which the difference value $T_{\delta sp}^*$ and the distribution gain $G_{\delta sp}$ are plotted on the horizontal axis and the vertical axis, respectively, the gain map 91 has the following properties. That is, the distribution gain $G_{\delta sp}$ is set to a larger value as the difference value $T_{\delta sp}^*$ (absolute value) becomes larger and as the vehicle speed V becomes higher. Conversely, the distribution gain $G_{\delta sp}$ is set to a smaller value as the difference value $T_{\delta sp}^*$ (absolute value) becomes smaller and as the vehicle speed V becomes lower. The distribution gain $G_{\delta sp}$ is a value in the range of zero to one. The gain map 91 may be determined without taking the vehicle speed V into consideration.

The interpolation computation circuit 84 decides the proportions of use of the first spring reaction force torque $T_{sp1}^*$ and the second spring reaction force torque $T_{sp2}^*$ using the distribution gain $G_{\delta sp}$ which is computed by the distribution gain computation circuit 83, and computes the spring component $T_{sp}^*$ of the basic drive torque $T_p^*$ on the basis of the proportions of use.

The spring component $T_{sp}^*$ of the basic drive torque $T_p^*$ is calculated by the following formula (D), for example. In the formula (D), G is an appropriate distribution gain, and the distribution gain $G_{\delta sp}$ which is computed by the distribution gain computation circuit 83 is applied here.

$$T_{sp}^* = T_{sp1}^* \cdot (1-G) + T_{sp2}^* \cdot G \qquad (D)$$

In the formula (D), the distribution gain G is set to a value from zero to one. When the distribution gain G is zero, the proportion of use of the first spring reaction force torque $T_{sp1}^*$ is 100%. When the distribution gain G is one, the proportion of use of the second spring reaction force torque $T_{sp2}^*$ is 100%. When the distribution gain G is a value between one and zero, the first spring reaction force torque $T_{sp1}^*$ and the second spring reaction force torque $T_{sp2}^*$ are summed up at specified proportions of use that match the value of the distribution gain G. In this way, the proportions of use of the first spring reaction force torque $T_{sp1}*$ and the second spring reaction force torque $T_{sp2}*$ are adjusted in accordance with the value of the distribution gain G.

As indicated in the graph of FIG. 5 described earlier, the distribution gain $G_{\delta sp}$ is set to a larger value as the difference value $T_{\delta sp}*$ between the first spring reaction force torque $T_{sp1}*$ and the second spring reaction force torque $T_{sp2}*$ becomes larger and as the vehicle speed V becomes higher. Therefore, the proportion of use of the second spring reaction force torque $T_{sp2}*$ is larger and the proportion of use of the first spring reaction force torque $T_{sp1}*$ is smaller as the difference value $T_{\delta sp}*$ becomes larger and as the vehicle speed V becomes higher. Conversely, the distribution gain $G_{\delta sp}$ is set to a smaller value as the difference value $T_{\delta sp}*$ becomes smaller and as the vehicle speed V becomes lower. Therefore, the proportion of use of the second spring reaction force torque $T_{sp2}*$ is smaller and the proportion of use of the first spring reaction force torque $T_{sp1}*$ is larger as the difference value $T_{\delta sp}*$ becomes smaller and as the vehicle speed V becomes lower.

The interpolation computation circuit 84 sums up the first spring reaction force torque $T_{sp1}*$ and the second spring reaction force torque $T_{sp2}*$, the proportions of use of which have been set, to compute the spring component $T_{sp}*$ of the basic drive torque $T_p*$ as indicated by the formula (D) given earlier.

Next, the function and the effect of the ideal vehicle model 72 will be described. Here, separate descriptions will be made for two travel situations, namely a situation in which the vehicle is traveling on a dry road and a situation in which the vehicle is traveling on a low-friction road (such as a frozen road or a compacted snow road) with a small road surface frictional resistance compared to that on the dry road.

First, a case where the vehicle is traveling on a flat dry road will be described. In this case, the tires of the vehicle grip on the road surface. Therefore, the vehicle is subjected to the lateral acceleration LA which matches the target pinion angle $\theta_p*$, that is, the steered angle $\theta_{ta}$ of the steered wheels 26 and 26. Thus, as the first spring reaction force torque $T_{sp1}*$ which is based on the target pinion angle $\theta_p*$ is increased, the second spring reaction force torque $T_{sp2}*$ which is based on the lateral acceleration LA is also increased. Conversely, if the first spring reaction force torque $T_{sp1}*$ is decreased, the second spring reaction force torque $T_{sp2}*$ is also decreased. Therefore, the difference value $T_{\delta sp}*$ between the first spring reaction force torque $T_{sp1}*$ and the second spring reaction force torque $T_{sp2}*$ is not increased or decreased significantly when the vehicle is traveling on a dry road with the tires gripping. The difference value $T_{\delta sp}*$ matches the travel state of the vehicle at each time.

The first spring reaction force torque $T_{sp1}*$ which is based on the target pinion angle $\theta_p*$ contributes to the so-called sense of rigidity (sense of stability) of steering. In addition, the second spring reaction force torque $T_{sp2}*$ which is based on the lateral acceleration LA contributes to the sense of integrity with the vehicle. Therefore, the proportions of use of the first spring reaction force torque $T_{sp1}*$ and the second spring reaction force torque $T_{sp2}*$ are adjusted in accordance with the travel state of the vehicle at each time, which makes it possible to suitably obtain the sense of rigidity of steering and the sense of integrity with the vehicle in accordance with the travel state of the vehicle at each time. For example, in the case where lateral acceleration that acts on the vehicle is increased along with steering, in which the driver feels the lateral acceleration LA which matches the steering amount with his/her body, the driver can feel a sense of rigidity that matches the steering amount at each time as a response, and feel a steering reaction force that matches the lateral acceleration at each time as a response. In this way, the sense of rigidity of steering and the sense of integrity with the vehicle are harmonized with each other, which makes it easy for the driver to drive the vehicle.

Next, a case where the vehicle is traveling on a flat low-friction road will be described. In this case, the vehicle is less likely to be subjected to the lateral acceleration LA because of a fact that the tires have less grip on the road surface or the like. Therefore, when the travel state of the vehicle is oversteer (including spinning etc.) or understeer, for example, the lateral acceleration LA which is detected through the lateral acceleration sensor 440 has a small value compared to that when the vehicle is traveling on a dry road.

Here, the first spring reaction force torque $T_{sp1}*$ is decided in accordance with the target pinion angle $\theta_p*$. Therefore, the first spring reaction force torque $T_{sp1}*$ basically has a value that matches the target pinion angle $\theta_p*$, irrespective of the lateral acceleration LA (road surface state). In contrast, the second spring reaction force torque $T_{sp2}*$ is decided in accordance with the lateral acceleration LA, and therefore affected by the lateral acceleration LA. For example, as the frictional resistance of the road surface on which the vehicle is traveling becomes smaller, the lateral acceleration LA which acts on the vehicle, and hence the second spring reaction force torque $T_{sp2}*$, have smaller values. Therefore, in the case where the vehicle is traveling on a low-friction road, the difference value $T_{\delta sp}*$ (absolute value) between the first spring reaction force torque $T_{sp1}*$ and the second spring reaction force torque $T_{sp2}*$ is larger as the frictional resistance of the road surface is smaller.

As indicated in the graph of FIG. 5 described earlier, the distribution gain $G_{\delta sp}$ has a larger value as the difference value $T_{\delta sp}*$ is increased. That is, as the difference value $T_{\delta sp}*$ is increased, the proportion of use of the second spring reaction force torque $T_{sp2}*$ which contributes to the sense of integrity with the vehicle becomes larger, and the proportion of use of the first spring reaction force torque $T_{sp1}*$ which contributes to the sense of rigidity of steering becomes smaller. Therefore, the sense of integrity with the vehicle is enhanced and the sense of rigidity of steering is decreased by setting the proportion of use of the second spring reaction force torque $T_{sp2}*$ to be larger and setting the proportion of use of the first spring reaction force torque $T_{sp1}*$ to be smaller. The driver can easily grasp a fact that the vehicle is traveling on a low-friction road, on which the driver is originally less likely to feel a stable response as a steering feel, by feeling that the sense of rigidity has been decreased as a response. The driver can obtain a response that conforms to the actual low-friction road, and therefore can perform a steering operation without a sense of discomfort.

In addition, as discussed earlier, in the case where the vehicle is traveling on a low-friction road, the vehicle is less likely to be subjected to lateral acceleration, and therefore the actually detected lateral acceleration LA has a smaller value. Here, as indicated by the formula (C) given earlier, the second spring reaction force torque $T_{sp2}*$ has a value that matches the value of the lateral acceleration LA. As also seen from the formula (C), the second spring reaction force torque $T_{sp2}*$ can be considered as a constant number of times the lateral acceleration LA, and thus has a smaller value as the lateral acceleration LA is decreased. Therefore, the spring component $T_{sp}*$ of the basic drive torque $T_p*$ which is computed using the formula (D) given earlier has a smaller value that matches the value of the second spring reaction force torque $T_{sp2}^*$. Then, in the subtractor 74 of the ideal EPS model 71, the spring component $T_{sp}^*$ with a smaller value is subtracted from the basic drive torque $T_p^*$. That is, the subtraction value $T_p^{**}$ which is calculated by the subtractor 74 is larger in accordance with the smaller value of the second spring reaction force torque $T_{sp2}^*$. Hence, the value of the target pinion angle $\theta_p^*$ which is computed on the basis of the subtraction value $T_p^{}$ is also increased in accordance with the subtraction value $T_p^{}$.

The correction component $T_{a2}^*$ which is calculated by the pinion angle feedback control circuit 63 also becomes larger in accordance with the amount of increase in target pinion angle $\theta_p^*$. As the value of the correction component $T_{a2}^*$ to be added to the basic assist component $T_{a1}^*$ becomes larger, the assist command value $T_a^*$, and hence the current command value I*, become larger. Then, as the current command value I* becomes larger, motor torque of the motor 31, and hence a steering assist force to be applied for steering, are increased. That is, the steering reaction force to be felt by the driver through steering is decreased. The driver can grasp a fact that the vehicle is traveling on a low-friction road more easily by feeling that the steering reaction force has been decreased as a response.

In this way, a steering reaction force that matches the road surface state (lateral acceleration LA) can be obtained. Therefore, the driver can easily grasp the road surface state through the steering reaction force, and the response that the driver himself/herself images and the actual response can be more similar to each other.

In the properties of the gain map 91 according to this example, as indicated in the graph of FIG. 5 described earlier, the distribution gain $G_{\delta sp}$ is set to a larger value as the difference value $T_{\delta sp}^*$ between the first spring reaction force torque $T_{sp1}^*$ and the second spring reaction force torque $T_{sp2}^*$ becomes larger with reference to zero and as the vehicle speed V becomes higher. However, the gain map 91 may have the following properties. That is, when the difference value $T_{\delta sp}^*$ is a value in the range of zero or more and a threshold value $T_{th}$ or less, the distribution gain $G_{\delta sp}$ is set to a value of zero. When the difference value $T_{\delta sp}^*$ is a value of more than the threshold value $T_{th}$, the distribution gain $G_{\delta sp}$ is set to a larger value as the difference value $T_{\delta sp}^*$ becomes larger with reference to the threshold value $T_{th}$ and as the vehicle speed V becomes higher. Here, the threshold value $T_{th}$ is a value, with reference to which it is determined that the vehicle is traveling on a low-friction road or the vehicle is skidding, and has been set in advance through an experiment or the like.

The properties of variation in proportion of use (distribution gain $G_{\delta sp}$) of the second spring reaction force torque $T_{sp2}^*$ with respect to an increase in difference value $T_{\delta sp}^*$ may be changed as appropriate in accordance with the required specifications or the like, irrespective of whether or not the threshold value $T_{th}$ (dead band) is set as discussed earlier. For example, the distribution gain $G_{\delta sp}$ may be increased linearly or increased stepwise with respect to an increase in difference value $T_{\delta sp}^*$. In the case where the difference value $T_{\delta sp}^*$ is increased, the proportion of use of the second spring reaction force torque $T_{sp2}^*$ may be increased compared to that before the difference value $T_{\delta sp}^*$ is increased.

Next, a second embodiment in which a steering control device is embodied in an electric power steering device for a vehicle will be described below. This embodiment basically has a configuration that is similar to that of the first embodiment illustrated in FIGS. 1 to 5. This example differs from the first embodiment in the method by which the ideal vehicle model 72 computes the spring component $T_{sp}^*$. The ideal vehicle model 72 according to this example has the following components in addition to the first vehicle reaction force model 81, the second vehicle reaction force model 82, and the distribution gain computation circuit 83 illustrated in FIG. 4 described earlier.

Figure 6:
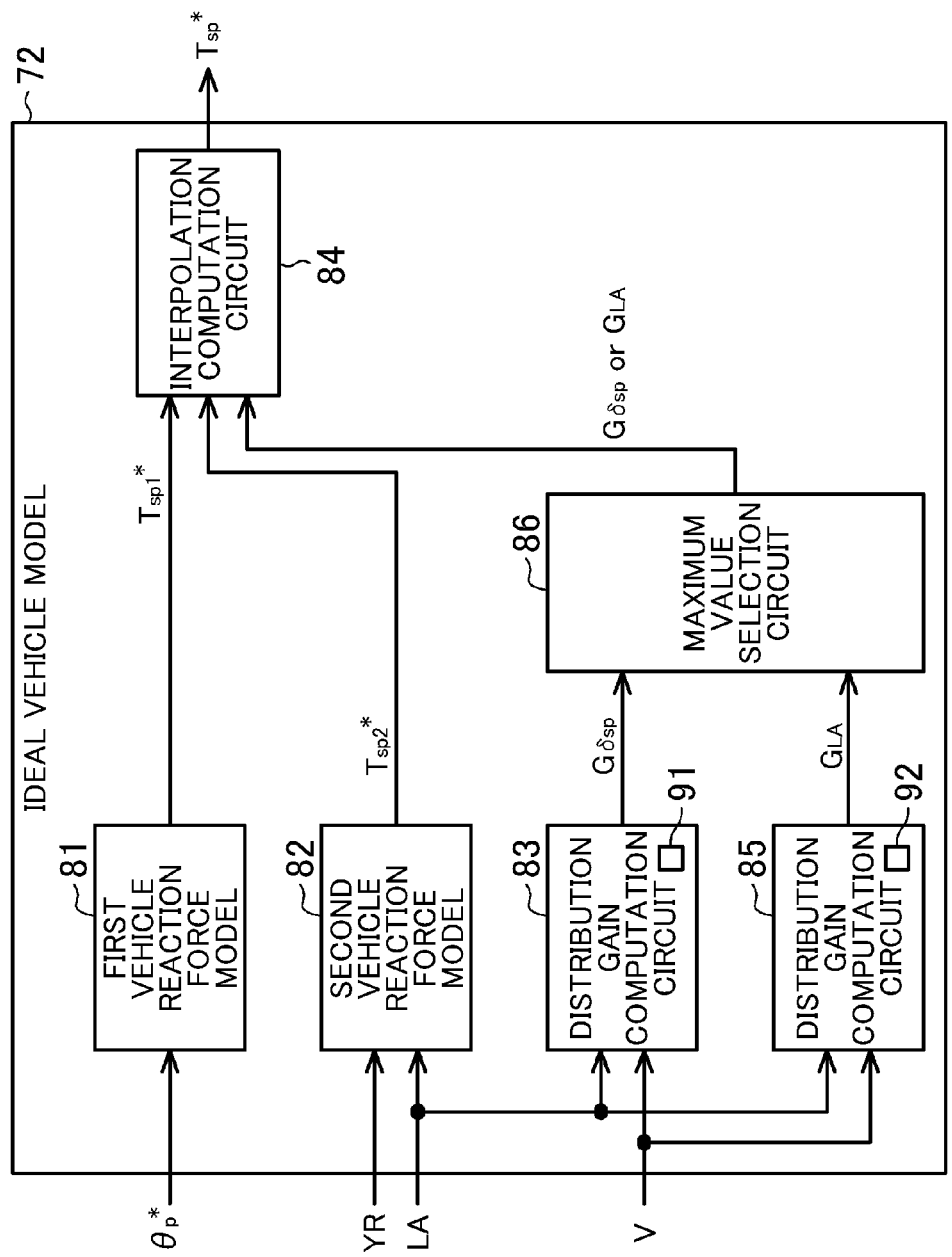
FIG. 6 is a control block diagram of an electronic control device according to a second embodiment.

As illustrated in FIG. 6, the ideal vehicle model 72 has a distribution gain computation circuit 85 and a maximum value selection circuit 86. The distribution gain computation circuit 85 computes a distribution gain $G_{LA}$ using its own gain map 92. The gain map 92 is a three-dimensional map that prescribes the relationship between the lateral acceleration LA and the distribution gain $G_{LA}$ for each vehicle speed V (or vehicle speed range). The distribution gain $G_{LA}$ is used to decide the proportions of use of the first spring reaction force torque $T_{sp1}^*$ and the second spring reaction force torque $T_{sp2}^*$.

Figure 7:
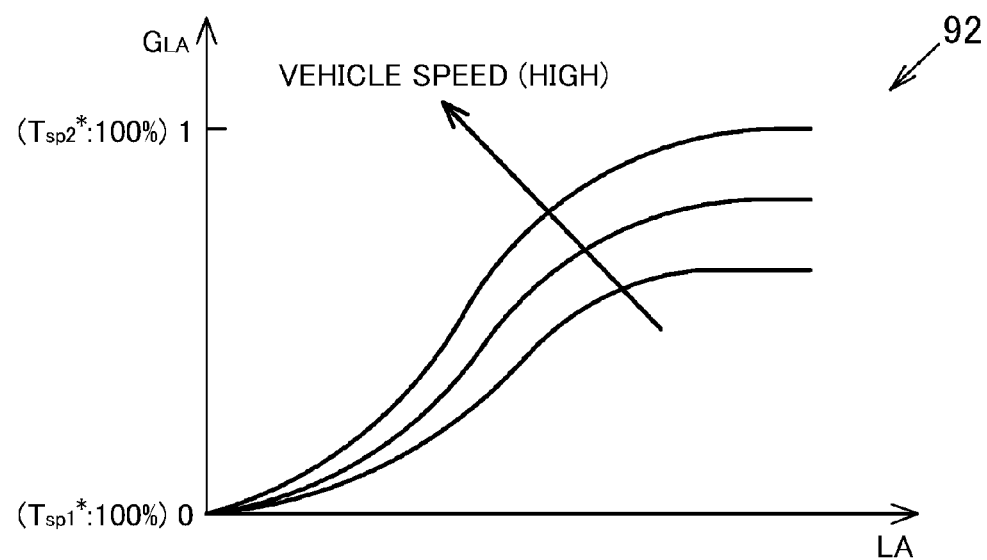
FIG. 7 is a graph illustrating a gain map according to the second embodiment.

As illustrated in the graph of FIG. 7, in which the lateral acceleration LA and the distributed gain $G_{LA}$ are plotted on the horizontal axis and the vertical axis, respectively, the gain map 92 has the following properties. That is, the distribution gain $G_{LA}$ is set to a larger value as the lateral acceleration LA becomes larger and as the vehicle speed V becomes higher. Therefore, the proportion of use of the second spring reaction force torque $T_{sp2}^*$ is larger and the proportion of use of the first spring reaction force torque $T_{sp1}^*$ is smaller as the lateral acceleration LA becomes larger and as the vehicle speed V becomes higher. Conversely, the distribution gain $G_{LA}$ is set to a smaller value as the lateral acceleration LA becomes smaller and as the vehicle speed V becomes lower. Therefore, the proportion of use of the second spring reaction force torque $T_{sp2}^*$ is smaller and the proportion of use of the first spring reaction force torque $T_{sp1}^*$ is larger as the lateral acceleration LA becomes smaller and as the vehicle speed V becomes lower. The distribution gain $G_{LA}$ is a value in the range of zero to one. The gain map 92 may be determined without taking the vehicle speed V into consideration.

As illustrated in FIG. 6, the maximum value selection circuit 86 retrieves the distribution gain $G_{\delta sp}$ from the distribution gain computation circuit 83 described earlier, retrieves the distribution gain $G_{LA}$ from the distribution gain computation circuit 85, and selects the larger one of the retrieved distribution gains $G_{\delta sp}$ and $G_{LA}$.

The interpolation computation circuit 84 decides the proportions of use of the first spring reaction force torque $T_{sp1}^*$ and the second spring reaction force torque $T_{sp2}^*$ using the distribution gain $G_{\delta sp}$ or the distribution gain $G_{LA}$ which has been selected by the maximum value selection circuit 86, and computes the spring component $T_{sp}^*$ of the basic drive torque $T_p^*$ on the basis of the proportions of use. The spring component $T_{sp}^*$ of the basic drive torque $T_p^*$ is calculated by summing up the first spring reaction force torque $T_{sp1}^*$ and the second spring reaction force torque $T_{sp2}^*$, the proportions of use of which have been set, as indicated by the formula (D) given earlier. In the formula (D), the distribution gain $G_{\delta sp}$ or the distribution gain $G_{LA}$ is applied as the distribution gain G.

Next, the function and the effect of the ideal vehicle model 72 will be described. Here again, separate descriptions will be made for a situation in which the vehicle is traveling on a dry road and a situation in which the vehicle is traveling on a low-friction road.

First, a case where the vehicle is traveling on a flat dry road will be described. In this case, the tires of the vehicle grip on the road surface. Thus, the vehicle is subjected to the lateral acceleration LA which matches the target pinion angle $\theta_p{}^*$, that is, the steered angle $\theta_{ta}$ of the steered wheels 26 and 26. Therefore, the difference value $T_{\delta sp}{}^*$ between the first spring reaction force torque $T_{sp1}{}^*$ which is based on the target pinion angle $\theta_p{}^*$ and the second spring reaction force torque $T_{sp2}{}^*$ which is based on the lateral acceleration LA is basically not increased or decreased significantly. In contrast, the lateral acceleration LA which matches the behavior of the vehicle at each time acts on the vehicle. Thus, when the travel state of the vehicle is oversteer or understeer, for example, the distribution gain $G_{LA}$ which is based on the lateral acceleration LA tends to have a larger value than the distribution gain $G_{\delta sp}$ which is based on the difference value $T_{\delta sp}{}^*$, depending on the degree of the oversteer or the understeer. That is, in the case where the vehicle is traveling on a dry road, the maximum value selection circuit 86 tends to select the distribution gain $G_{LA}$ when the travel state of the vehicle is oversteer or understeer.

As indicated in the graph of FIG. 7 described earlier, the distribution gain $G_{LA}$ is set to a larger value as the lateral acceleration LA is larger. Therefore, the proportion of use of the second spring reaction force torque $T_{sp2}{}^*$ is larger and the proportion of use of the first spring reaction force torque $T_{sp1}{}^*$ is smaller as the lateral acceleration LA becomes larger. Conversely, the proportion of use of the second spring reaction force torque $T_{sp2}{}^*$ is smaller and the proportion of use of the first spring reaction force torque $T_{sp1}{}^*$ is larger as the lateral acceleration LA becomes smaller.

The first spring reaction force torque $T_{sp1}{}^*$ which is based on the target pinion angle $\theta_p{}^*$ contributes to the so-called sense of rigidity (sense of stability) of steering. In addition, the second spring reaction force torque $T_{sp2}{}^*$ which is based on the lateral acceleration LA contributes to the sense of integrity with the vehicle. Therefore, by adjusting the proportions of use of the second spring reaction force torque $T_{sp2}{}^*$ and the first spring reaction force torque $T_{sp1}{}^*$ in accordance with the lateral acceleration LA, it is possible to suitably obtain the sense of rigidity of steering and the sense of integrity with the vehicle in accordance with the travel state of the vehicle at each time.

For example, when a greater improvement in sense of integrity with the vehicle is required as the lateral acceleration LA becomes larger, the proportion of use of the second spring reaction force torque $T_{sp2}{}^*$ is increased and the proportion of use of the first spring reaction force torque $T_{sp1}{}^*$ is decreased in accordance with the increase in lateral acceleration LA. As the steering response is increased in accordance with the increase in lateral acceleration LA, the sense of integrity with the vehicle which matches the magnitude of the lateral acceleration LA can be obtained. In addition, the driver can drive the vehicle easily with the lateral acceleration LA which is felt by his/her body and the steering response corresponding with each other.

In addition, when the sense of integrity with the vehicle becomes less problematic as the lateral acceleration LA becomes smaller, the proportion of use of the second spring reaction force torque $T_{sp2}{}^*$ is decreased and the proportion of use of the first spring reaction force torque $T_{sp1}{}^*$ is increased in accordance with a decrease in lateral acceleration LA. Consequently, the sense of rigidity of steering is easily transmitted to the hands of the driver as a response, and therefore the driver can feel a dynamic response through steering. In this way, the sense of rigidity of steering and the sense of integrity with the vehicle are harmonized with each other, which makes it easy for the driver to drive the vehicle.

Next, a case where the vehicle is traveling on a flat low-friction road will be described. In this case, the vehicle is less likely to be subjected to the lateral acceleration LA because of a fact that the tires have less grip on the road surface or the like. Here, the first spring reaction force torque $T_{sp1}{}^*$ which is based on the target pinion angle $\theta_p{}^*$ has a value that matches the target pinion angle $\theta_p{}^*$, irrespective of the road surface state. In addition, the second spring reaction force torque $T_{sp2}{}^*$ which is based on the lateral acceleration LA tends to have a smaller value that matches the lateral acceleration LA. That is, the difference value $T_{\delta sp}{}^*$ between the first spring reaction force torque $T_{sp1}{}^*$ and the second spring reaction force torque $T_{sp2}{}^*$ tends to have a larger value. In the case where the vehicle is traveling on a low-friction road, the difference value $T_{\delta sp}{}^*$ has a larger value as there is a greater tendency toward oversteer or understeer. Therefore, the distribution gain $G_{\delta sp}$ which is computed through the gain map 91 has a larger value. In contrast, the vehicle is less likely to be subjected to the lateral acceleration LA, and therefore the actual lateral acceleration LA which is detected through the lateral acceleration sensor 440 has a smaller value compared to that when the vehicle is traveling on a dry road. Thus, the distribution gain $G_{LA}$ which is computed through the gain map 92 illustrated in FIG. 7 described earlier has a smaller value. In this way, when the vehicle is traveling on a low-friction road, the distribution gain $G_{LA}$ which is based on the lateral acceleration LA tends to have a smaller value, and the distribution gain $G_{\delta sp}$ which is based on the difference value $T_{\delta sp}{}^*$ tends to have a larger value. Therefore, when the vehicle is traveling on a low-friction road, the maximum value selection circuit 86 basically tends to select the distribution gain $G_{\delta sp}$, depending on the magnitude of the frictional resistance of the road surface or the steering state.

As indicated in the graph of FIG. 5 described earlier, the distribution gain $G_{\delta sp}$ is set to a larger value as the difference value $T_{\delta sp}{}^*$ between the first spring reaction force torque $T_{sp1}{}^*$ and the second spring reaction force torque $T_{sp2}{}^*$ becomes larger (i.e. in a situation in which the vehicle is more likely to skid). Therefore, the proportion of use of the second spring reaction force torque $T_{sp2}{}^*$ is larger and the proportion of use of the first spring reaction force torque $T_{sp1}{}^*$ is smaller as the difference value $T_{\delta sp}{}^*$ becomes larger. The first spring reaction force torque $T_{sp1}{}^*$ which is based on the target pinion angle $\theta_p{}^*$ contributes to the so-called sense of rigidity (sense of stability) of steering. In addition, the second spring reaction force torque $T_{sp2}{}^*$ which is based on the lateral acceleration LA contributes to the sense of integrity with the vehicle. Therefore, the sense of integrity with the vehicle is enhanced and the sense of rigidity of steering is decreased by setting the proportion of use of the second spring reaction force torque $T_{sp2}{}^*$ to be larger and setting the proportion of use of the first spring reaction force torque $T_{sp1}{}^*$ to be smaller. The driver can easily grasp a fact that the vehicle is traveling on a low-friction road, on which the driver is originally less likely to feel a stable response as a steering feel, by feeling that the sense of rigidity has been decreased as a response. The driver can obtain a response that conforms to the actual low-friction road, and therefore can perform a steering operation without a sense of discomfort.

Next, a third embodiment in which a steering control device is embodied in a steering device of a steer-by-wire type for a vehicle will be described below. In the steering device of a steer-by-wire type, the steering wheel and the steered wheels are mechanically decoupled from each other.

Figure 8:
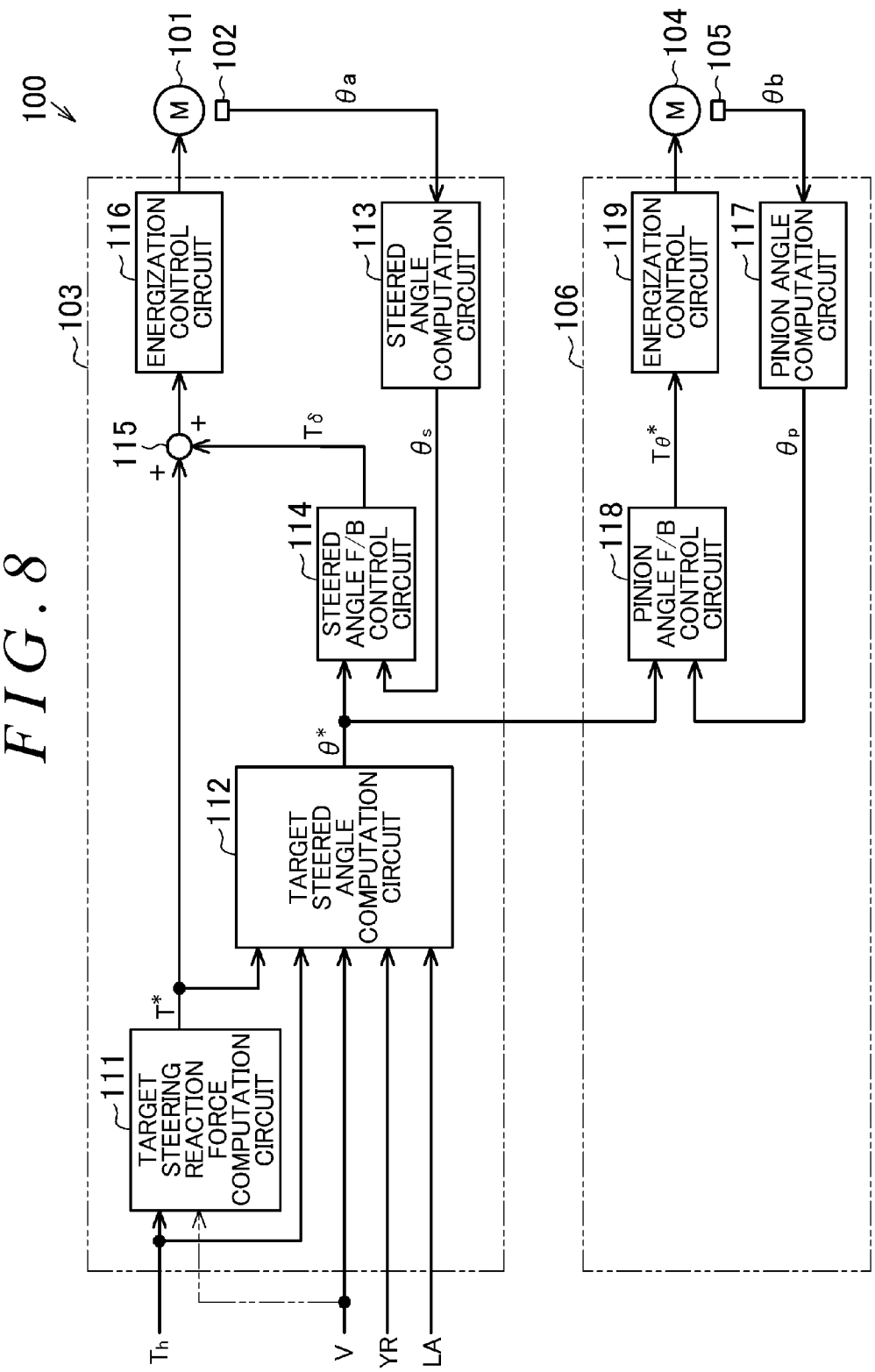
FIG. 8 is a control block diagram of an electronic control device according to a third embodiment.

As illustrated in FIG. 8, a steering device 100 has a reaction force motor 101, a rotational angle sensor 102, and a reaction force control circuit 103 as components for generating a steering reaction force. The reaction force motor 101 is a generation source for the steering reaction force. Torque from the reaction force motor 101 is applied to the steering shaft as the steering reaction force. The rotational angle sensor 102 detects a rotational angle $\theta_a$ of the reaction force motor 101. The reaction force control circuit 103 executes reaction force control in which a steering reaction force that matches the steering torque $T_h$ is generated through energization control for the reaction force motor 101.

The steering device 100 also has a steering motor 104, a rotational angle sensor 105, and a steering control circuit 106 as components for generating a steering force which is power for steering steered wheels. The steering motor 104 is a generation source for the steering force. Torque from the steering motor 104 is applied to the steered shaft via the pinion shaft as the steering force. The rotational angle sensor 105 detects a rotational angle $\theta_b$ of the steering motor 104. The steering control circuit 106 executes steering control in which the steered wheels are steered in accordance with the steering state through energization control for the steering motor 104.

The reaction force control circuit 103 has a target steering reaction force computation circuit 111, a target steered angle computation circuit 112, a steered angle computation circuit 113, a steered angle feedback control circuit 114, an adder 115, and an energization control circuit 116.

The target steering reaction force computation circuit 111 computes a target steering reaction force T* on the basis of the steering torque $T_h$.

The target steering reaction force computation circuit 111 may compute the target steering reaction force T* in consideration of the vehicle speed V. The target steered angle computation circuit 112 computes a target steered angle $\theta^*$ for the steering wheel on the basis of the target steering reaction force T* and the steering torque $T_h$. The steered angle computation circuit 113 computes an actual steered angle $\theta_s$ of the steering wheel on the basis of the rotational angle $\theta_a$ of the reaction force motor 101 which is detected through the rotational angle sensor 102. The steered angle feedback control circuit 114 computes a steered angle correction amount $T_\delta$ through feedback control for the steered angle $\theta_s$ in order to cause the actual steered angle $\theta_s$ to follow the target steered angle $\theta^*$. The adder 115 adds the steered angle correction amount $T_\delta$ to the target steering reaction force T* to calculate the final target steering reaction force T*. The energization control circuit 116 supplies electric power that matches the final target steering reaction force T* to the reaction force motor 101. Consequently, the reaction force motor 101 generates torque that matches the final target steering reaction force T*. It is possible to provide the driver with a suitable responsive feel that matches the road surface reaction force.

The steering control circuit 106 has a pinion angle computation circuit 117, a pinion angle feedback control circuit 118, and an energization control circuit 119. The pinion angle computation circuit 117 computes the pinion angle $\theta_p$, which is the actual rotational angle of the pinion shaft, on the basis of the rotational angle $\theta_b$ of the steering motor 104 which is detected through the rotational angle sensor 105. The pinion angle feedback control circuit 118 retrieves the target steered angle $\theta^*$, which is computed by the target steered angle computation circuit 112, as a target pinion angle.

The pinion angle feedback control circuit 118 computes a pinion angle command value $T_\theta^*$ through feedback control for the pinion angle $\theta_p$ in order to cause the actual pinion angle $\theta_p$ to follow the target steered angle $\theta^*$. The energization control circuit 119 supplies electric power that matches the pinion angle command value $T_\theta^*$ to the steering motor 104. Consequently, the steering motor 104 is rotated by an angle that matches the pinion angle command value $T_\theta^*$. That is, the steered wheels are steered by an amount corresponding to an operation of the steering wheel.

Using such a configuration of the steering device 100 as a precondition, the computation function of the target pinion angle computation circuit 62 in the first embodiment or the second embodiment described earlier can be applied to the target steered angle computation circuit 112, and the computation function of the pinion angle feedback control circuit 63 can be applied to the steered angle feedback control circuit 114.

In this case, the target steered angle computation circuit 112 of the reaction force control circuit 103 has a functional configuration that is similar to that of the target pinion angle computation circuit 62 (see FIG. 2) described earlier. In contrast to the target pinion angle computation circuit 62 described earlier which retrieves the basic assist component $T_{a1}^*$, the target steered angle computation circuit 112 according to this example retrieves the target steering reaction force T*. The target steered angle computation circuit 112 is the same as the target pinion angle computation circuit 62 described earlier in retrieving the steering torque $T_h$, the vehicle speed V, the yaw rate YR, and the lateral acceleration LA. In contrast to the target pinion angle computation circuit 62 described earlier which computes the target pinion angle $\theta_p^*$, in addition, the target steered angle computation circuit 112 according to this example computes the target steered angle $\theta^*$. Except for a part of the signals to be retrieved and the signal to be generated, the content of the internal computation process performed by the target steered angle computation circuit 112 is the same as that performed by the target pinion angle computation circuit 62 described earlier.

In addition, the steered angle feedback control circuit 114 of the reaction force control circuit 103 has a function that is similar to that of the pinion angle feedback control circuit 63 described earlier. In contrast to the pinion angle feedback control circuit 63 described earlier which computes the correction component $T_{a2}^*$ for the basic assist component $T_{a1}^*$ through execution of feedback control for the pinion angle $\theta_p$, the steered angle feedback control circuit 114 according to this example computes the steered angle correction amount $T_\delta$ through execution of feedback control for the steered angle $\theta_s$. Except for the target of the feedback control, the content of the internal computation process performed by the steered angle feedback control circuit 114 is the same as that performed by the pinion angle feedback control circuit 63 described earlier.

In the steering device 100 of a steer-by-wire type, the steering wheel and the steered wheels are mechanically decoupled from each other, and therefore the road surface reaction force from the tires is not directly transmitted to the steering wheel. Therefore, road surface information such as the slipperiness of the road surface is not easily transmitted to the steering wheel as a response.

In this respect, in the case where the first embodiment is applied to the steering device 100, the following functions are achieved. When the vehicle is traveling on a flat dry road with the tires gripping, the vehicle is subjected to the lateral acceleration LA which matches the target pinion angle $\theta_p^*$ and hence the steered angle $\theta_{ta}$ of the steered wheels 26 and 26. Therefore, the difference value $T_{\delta sp}*$ between the first spring reaction force torque $T_{sp1}*$ and the second spring reaction force torque $T_{sp2}*$ is not increased or decreased significantly, and the proportions of use of the first spring reaction force torque $T_{sp1}*$ which contributes to the sense of rigidity of steering and the second spring reaction force torque $T_{sp2}*$ which contributes to the sense of integrity with the vehicle match the travel state of the vehicle at each time. Then, the proportions of use of the first spring reaction force torque $T_{sp1}*$ and the second spring reaction force torque $T_{sp2}*$ are adjusted in accordance with the travel state of the vehicle at each time, which makes it possible to suitably obtain the sense of rigidity of steering and the sense of integrity with the vehicle in accordance with the travel state of the vehicle at each time. The driver can feel a sense of rigidity that matches the steering amount at each time as a response, and feel a steering reaction force that matches the lateral acceleration at each time as a response.

When the vehicle is traveling on a flat low-friction road, meanwhile, the vehicle is less likely to be subjected to the lateral acceleration LA, and therefore the second spring reaction force torque $T_{sp2}*$ has a smaller value. Therefore, the difference value $T_{\delta sp}*$ between the first spring reaction force torque $T_{sp1}*$ and the second spring reaction force torque $T_{sp2}*$ tends to have a larger value. The distribution gain $G_{\delta sp}$ has a larger value as the difference value $T_{\delta sp}*$ is increased (as the vehicle is more likely to skid). That is, as the difference value $T_{\delta sp}*$ is increased, the proportion of use of the second spring reaction force torque $T_{sp2}*$ which contributes to the sense of integrity with the vehicle becomes larger, and the proportion of use of the first spring reaction force torque $T_{sp1}*$ which contributes to the sense of rigidity of steering becomes smaller. Thus, the driver can grasp a fact that the vehicle is traveling on a low-friction road easily by feeling that the sense of rigidity of steering has been decreased as a response.

In the case where the second embodiment is applied to the steering device 100, meanwhile, the following functions are achieved.

When the vehicle is traveling on a flat dry road with the tires gripping, the proportion of use of the second spring reaction force torque $T_{sp2}*$ which contributes to the sense of integrity with the vehicle is increased and the proportion of use of the first spring reaction force torque $T_{sp1}*$ which contributes to the sense of rigidity of steering is decreased along with an increase in lateral acceleration LA.

Therefore, the target steered angle $\theta*$ reflects the second spring reaction force torque $T_{sp2}*$ more strongly. The reaction force motor 101 generates torque that reflects the target steered angle $\theta*$ as a steering reaction force. Thus, the sense of rigidity of steering is decreased and the sense of integrity with the vehicle is increased in accordance with an increase in lateral acceleration LA. It is possible to obtain a sense of integrity with the vehicle that matches the magnitude of the lateral acceleration LA.

When the vehicle is traveling on a flat low-friction road, meanwhile, the vehicle is less likely to be subjected to the lateral acceleration LA. Therefore, the second spring reaction force torque $T_{sp2}*$ has a smaller value. In contrast, the first spring reaction force torque $T_{sp1}*$ has a value that matches the target steered angle $\theta*$, irrespective of the road surface state. That is, as the frictional resistance of the road surface becomes smaller and as the target steered angle $\theta*$ is set to a larger value, the difference value $T_{\delta sp}*$ between the first spring reaction force torque $T_{sp1}*$ and the second spring reaction force torque $T_{sp2}*$ is larger. The proportion of use of the second spring reaction force torque $T_{sp2}*$ is increased and the proportion of use of the first spring reaction force torque $T_{sp1}*$ is decreased along with an increase in difference value $T_{\delta sp}*$. Therefore, the first spring reaction force torque $T_{sp1}*$ which contributes to the sense of rigidity of steering is less reflected in the target steered angle $\theta*$. Then, the reaction force motor 101 generates torque that reflects the target steered angle $\theta*$ as a steering reaction force. The driver can easily recognize that the vehicle is traveling on a low-friction road by feeling that the sense of rigidity has been decreased as a response.

As described above, by applying the first embodiment or the second embodiment to the steering device 100, it is possible to apply a steering reaction force that matches the road surface state (road surface reaction force) to steering through the reaction force motor 101. Therefore, the road surface state can be transmitted to the driver as a steering reaction force more appropriately.

Each of the embodiments may also be implemented in the following modified forms.

In the first to third embodiments, the lateral acceleration which acts on the vehicle is detected using the lateral acceleration sensor 440. However, the lateral acceleration may be estimated on the basis of the yaw rate YR and the vehicle speed V. Estimated lateral acceleration may be obtained by multiplying the yaw rate YR and the vehicle speed V with each other.

In the first and second embodiments, the torque sensor 420 is provided to the column shaft 22a. However, the torque sensor 420 may be provided to the intermediate shaft 22b or the pinion shaft 22c. The torque sensor 420 may be provided at any appropriate position of the steering mechanism 20 as long as the steering torque $T_h$ can be detected.

In the first and second embodiments, the pinion angle feedback control circuit 63 performs PID control on the pinion angle $\theta_p$. However, the pinion angle feedback control circuit 63 may perform PI control. The same applies to the steered angle feedback control circuit 114 in the third embodiment.

In the first and second embodiments, feedback control is performed on the pinion angle $\theta_p$ which corresponds to the steered angle $\theta_{ta}$ of the steered wheels 26 and 26. However, feedback control may be performed on the rotational angle of the intermediate shaft 22b. In addition, feedback control may be performed on the rotational angle of an output shaft of the motor 31. Both the rotational angles of the intermediate shaft 22b and the output shaft of the motor 31 are values that reflect the steered angle $\theta_{ta}$. Therefore, feedback control can be performed indirectly on the steered angle $\theta_{ta}$ through feedback control on such rotational angles. Alternatively, the steered angle $\theta_{ta}$ of the steered wheels 26 and 26 may be detected, and feedback control may be performed directly on the steered angle $\theta_{ta}$. In this case, the target pinion angle computation circuit 62 functions as a target steered angle computation circuit, and the pinion angle feedback control circuit 63 functions as a steered angle feedback control circuit. Similarly, feedback control is performed on the steered angle $\theta_s$ in the third embodiment. However, feedback control may be performed on the rotational angle $\theta_a$ of the reaction force motor 101.

In the first and second embodiments, the ideal EPS model 71 calculates the target pinion angle $\theta_p$ (ideal pinion angle) on the basis of the total sum of the basic assist component $T_{a1}*$ and the steering torque $T_h$. However, the target pinion angle $\theta_p*$ may be calculated on the basis of only the steering torque $T_h$.

In the first and second embodiments, the basic assist component computation circuit 61 calculates the basic assist component $T_{a1}{}^*$ on the basis of the steering torque $T_h$ and the vehicle speed V. However, the basic assist component $T_{a1}{}^*$ may be calculated on the basis of only the steering torque $T_h$. In addition, the basic assist component computation circuit 61 may execute at least one of phase compensation control and torque differential control. In the phase compensation control, the phase of the steering torque $T_h$ which is detected by the torque sensor 420 may be varied on the basis of the assist gradient. In the torque differential control, it is desirable to make the value of the basic assist component $T_{a1}{}^*$ larger as the differential value of the basic assist component $T_{a1}{}^*$ is larger.

In the first and second embodiments, the electric power steering device 10 applies a steering assist force to the column shaft 22*a*. However, the present invention may be implemented in an electric power steering device of a type in which a steering assist force is applied to the pinion shaft 22*c* or the rack shaft 23, for example.

The invention claimed is:

1. A steering control device that controls a motor that serves as a generation source for a drive force to be applied to a steering mechanism of a vehicle on the basis of an assist command value computed in accordance with a steering operation, comprising:
    a first computation circuit that computes a basic component of the assist command value in accordance with at least steering torque; and
    a second computation circuit that computes a compensation component for the basic component through feedback control in which an actual rotational angle of a rotary body that rotates through the steering operation is caused to coincide with a target rotational angle calculated in accordance with the basic component, wherein
    the second computation circuit computes, on the basis of at least the target rotational angle, a first reaction force component for the basic component that is used to compute the target rotational angle,
    and the second computation circuit computes, on the basis of a state amount that reflects vehicle behavior or a road surface state, a second reaction force component for the basic component that is used to compute the target rotational angle,
    and the second computation circuit, in a case where a difference value between the first reaction force component and the second reaction force component is increased, increases a proportion of use of the second reaction force component compared to that before the difference value is increased.

2. The steering control device according to claim 1, wherein
    the second computation circuit increases the proportion of use of the second reaction force component as the difference value between the first reaction force component and the second reaction force component is increased.

3. The steering control device according to claim 1, wherein
    the second computation circuit computes a distribution gain that matches the difference value as a value that indicates a tendency of the difference value to be increased, and decides the proportions of use of the first reaction force component and the second reaction force component on the basis of the distribution gain.

4. The steering control device according to claim 1, wherein
    the second computation circuit computes a distribution gain that matches the difference value as a value that indicates a tendency of the difference value to be increased, computes a distribution gain that matches lateral acceleration, which is an example of the state amount, as a value that indicates a tendency of the lateral acceleration to be increased, and decides the proportions of use of the first reaction force component and the second reaction force component on the basis of a larger one of the distribution gains.

5. The steering control device according to claim 1, wherein
    based on a precondition that the steering mechanism is a steering mechanism of a rack-and-pinion type that has a steering shaft that includes a pinion shaft that serves as the rotary body and a steered shaft that steers steered wheels in conjunction with rotation of the pinion shaft, the motor is an assist motor that generates a steering assist force, which is torque in a same direction as a steering direction, as the drive force.

6. The steering control device according to claim 1, wherein
    based on a precondition that the steering mechanism is a steering mechanism of a steer-by-wire type in which a steering wheel that serves as the rotary body and steered wheels are mechanically decoupled from each other, the motor is a reaction force motor that generates a steering reaction force, which is torque in a direction opposite to a steering direction, as the drive force.

* * * * *